United States Patent
Polland et al.

(10) Patent No.: US 10,887,676 B2
(45) Date of Patent: Jan. 5, 2021

(54) SYSTEMS AND METHODS FOR OPTICALLY INITIATED INFORMATION COLLECTION FOR NETWORK CONNECTED DEVICES

(71) Applicant: CommScope Technologies LLC, Hickory, NC (US)

(72) Inventors: Joseph Polland, Eden Prairie, MN (US); Joseph C. Coffey, Burnsville, MN (US)

(73) Assignee: CommScope Technologies LLC, Hickory, NC (US)

( * ) Notice: Subject to any disclaimer, the term of this patent is extended or adjusted under 35 U.S.C. 154(b) by 56 days.

(21) Appl. No.: 16/408,719

(22) Filed: May 10, 2019

(65) Prior Publication Data
US 2019/0387294 A1 Dec. 19, 2019

Related U.S. Application Data

(60) Provisional application No. 62/685,216, filed on Jun. 14, 2018.

(51) Int. Cl.
*H04B 10/00* (2013.01)
*H04Q 11/00* (2006.01)
(Continued)

(52) U.S. Cl.
CPC ......... *H04Q 11/0067* (2013.01); *H04L 12/12* (2013.01); *H04L 41/069* (2013.01);
(Continued)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS

2007/0092257 A1* 4/2007 Smith .................... H04B 10/40
398/135

OTHER PUBLICATIONS

Roberts, "What is Optical Camera Communications (OCC)", IEEE P802.15 Working Group for Wireless Personal Area Networks (WPANs), Jan. 2015, pp. 1-12, Intel Labs.

* cited by examiner

*Primary Examiner* — Daniel G Dobson
(74) *Attorney, Agent, or Firm* — Fogg & Powers LLC

(57) ABSTRACT

Systems and methods for optically initiated information collection for network connected devices are provided. In one embodiment, a device comprises: at least one service port to connect a cable to the device; an optical information interface comprising: an optical information interface management function executed by a processor coupled to a memory; an optical information interface database that stores information associated with the device; and an optical emitter controller in communication with the optical information interface management function; wherein the optical information interface management function receives from the optical information interface database a set of information selected for optical broadcast; and wherein the optical emitter controller varies an optical output of at least one optical emitter to modulate the set of information selected for optical broadcast onto an optical signal generated by the at least one optical emitter.

18 Claims, 7 Drawing Sheets

(51) Int. Cl.
*H04L 12/26* (2006.01)
*H04L 12/24* (2006.01)
*H04L 12/12* (2006.01)
*H04J 14/00* (2006.01)

(52) U.S. Cl.
CPC ........ *H04L 41/0816* (2013.01); *H04L 43/065* (2013.01); *H04L 43/0811* (2013.01); *H04Q 2011/0083* (2013.01)

(58) Field of Classification Search
CPC ............ H04B 10/1127; H04B 10/1129; H04B 10/114; H04B 10/1141; H04B 10/1143; H04B 10/1149; H04B 10/116; H04B 10/118; H04B 10/40; H04B 10/07; H04B 10/0799
See application file for complete search history.

10,887,676 B2

SYSTEMS AND METHODS FOR OPTICALLY INITIATED INFORMATION COLLECTION FOR NETWORK CONNECTED DEVICES

CROSS-REFERENCE TO RELATED APPLICATIONS

This application is a United States Patent Application claiming priority to, and the benefit of, U.S. Provisional Patent Application No. 62/685,216, titled "SYSTEMS AND METHODS FOR OPTICALLY INITIATED INFORMATION COLLECTION FOR NETWORK CONNECTED DEVICES" file on Jun. 14, 2018, which is incorporated herein by reference in its entirety.

BACKGROUND

Automated infrastructure management (AIM) systems are typically used to automatically detect and document changes in patching connections made using structured cabling systems. Such patching connections are typically made by connecting two or more connections points (also referred to here as a "ports") located on the front side of patching equipment (such as patch panels). These patching connections are made using patch cords that are connected to the ports.

Typically, each port on the front of an item of patching equipment is connected by the patching equipment to a cable that is terminated at the rear of the patching equipment. Changes to such rear cables typically occur infrequently (for example, when the patching equipment is first installed or during building remodeling). This cabling is also referred to here as "fixed cabling." The other ends of such fixed cabling can be terminated at wall outlets that are located in the work area, consolidation points located near the work area, or at other patching equipment. In order to automatically detect changes in patching connections, such patching equipment typically includes, for each port, a respective sensor, reader, interface, or other circuitry (collectively referred to here as a "sensor") for use in determining the presence of, and/or information from or about, a connector and/or cable attached to the front of the associated port. The sensors are typically coupled to a controller, which receives and aggregates such port information and communicates it to a system manager for storage in a database. Such a controller can be deployed in each item of patching equipment or in a unit that is separate from the patching equipment. One example of the latter type of controller is a "rack controller" that is deployed in the same or nearby rack as the associated items of patching equipment.

As datacenter, enterprise and campus networks grow larger, it has become increasingly difficult to quickly locate and accurately identify specific network connected devices, such as patching equipment, in order to access information from the devices, from the AIM for those devices or for other purposes such as device maintenance. Given the large numbers of managed connectivity controllers, panels, switches, routers, servers etc. in such facilities, determining the identity of a specific network connected device can be cumbersome.

SUMMARY

The embodiments of the present disclosure provide system and methods for optically initiated information collection for network connected devices and will be understood by reading and studying the following specification.

Systems and methods for optically initiated information collection for network connected devices are provided. In one embodiment, a device comprises: at least one service port to connect a cable to the device; an optical information interface comprising: an optical information interface management function executed by a processor coupled to a memory; an optical information interface database that stores information associated with the device; and an optical emitter controller in communication with the optical information interface management function; wherein the optical information interface management function receives from the optical information interface database a set of information selected for optical broadcast; and wherein the optical emitter controller varies an optical output of at least one optical emitter to modulate the set of information selected for optical broadcast onto an optical signal generated by the at least one optical emitter.

DRAWINGS

Embodiments of the present disclosure can be more easily understood and further advantages and uses thereof more readily apparent, when considered in view of the description of the preferred embodiments and the following figures in which.

Figure 5:
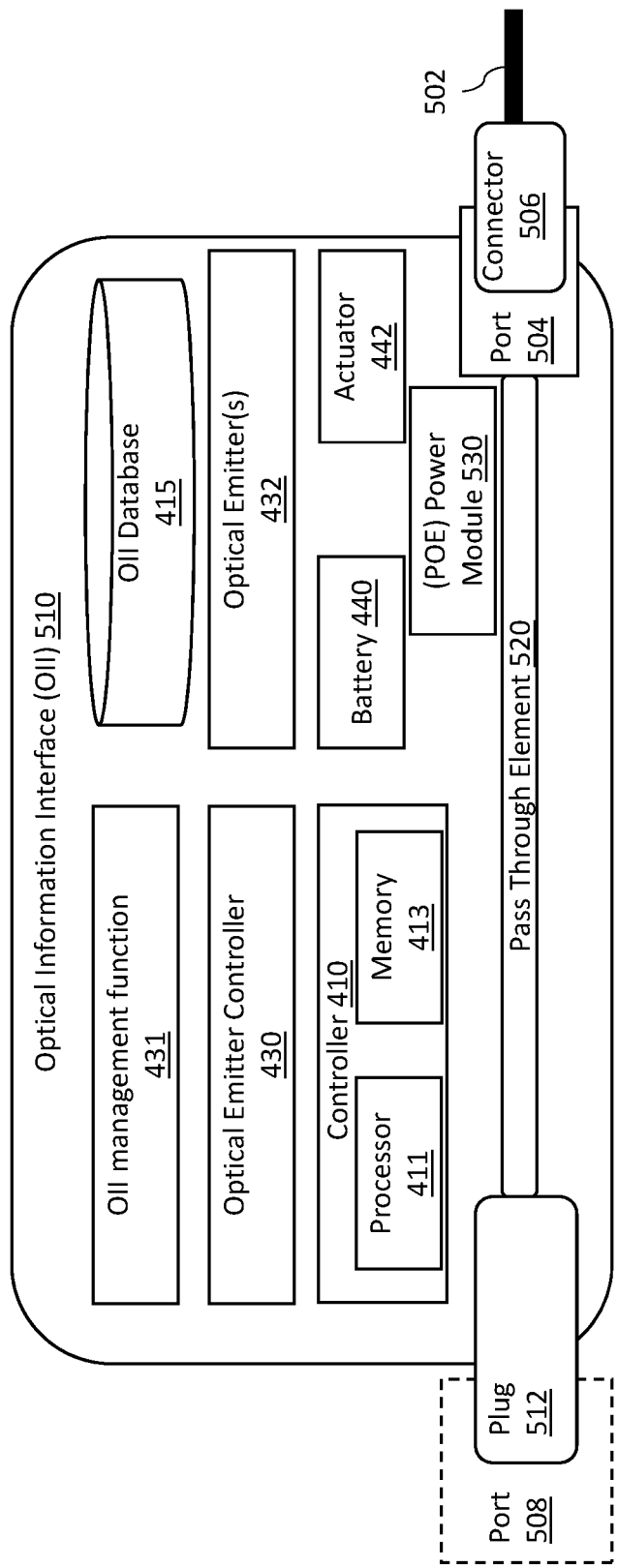

FIG. 5 a diagram of another optical information interface of one embodiment of the present disclosure for use with a patch cable.

Figure 6:
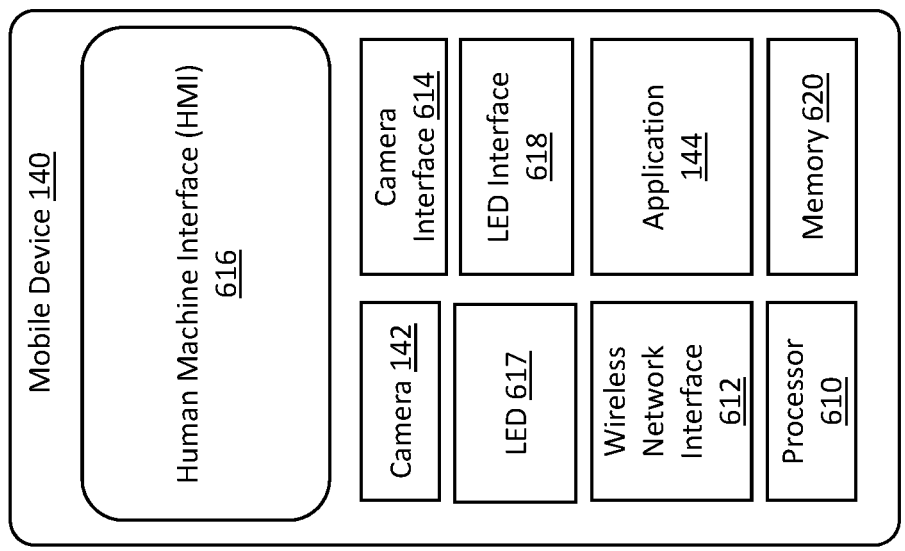

FIG. 6 a diagram of a mobile device for use in conjunction with an optical information interface of one embodiment of the present disclosure.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide technicians with the ability to quickly and accurately initiate wireless communications with any network connected device within a facility, by providing these devices with an optical information interface from which information about the network connected device may be easily obtained from an optically broadcast signal. More specifically, an optical information interface located on a network connected device broadcasts a short-range optical signal which may be used, for example, to communicate a network address. A technician's mobile device may then be used to link the mobile device to a network connected device's local network management interface or a server that can provide information about that network connected device. For applications where the network connected device is a managed device, the network management interface may provide access to a local server within the device, such as a web server, through which the technician's mobile device can access status, configuration, or other data maintained by the device. In other embodiments, the network connected device may be an unmanaged device. In such embodiments, the mobile device may receive from the optical information interface a network address for a remote server that can provide general information about the network connected device (such model number, and access to relevant user manuals or data sheets) and/or access to an AIM system manager that maintains configuration logs associated with the network connected device. In other embodiments, information carried by the short-range optical signal may directly communicate status information regarding one or more aspects of the network connected device's operation. Such status information may be transmitted either instead of, or in addition to, a network address. By directing the camera of their mobile device at a selected network connected device, a technician can read the short-range optical signal and a browser on their mobile device will be directed to the network address and/or display information relevant to that selected device. As such, a technician working within a crowded datacenter or similar facility can accurately obtain information for the desired device based on the short-range optical signal, minimizing the effort needed to positively identify the device and minimizing the potential for mis-identifying the device.

Figure 1:
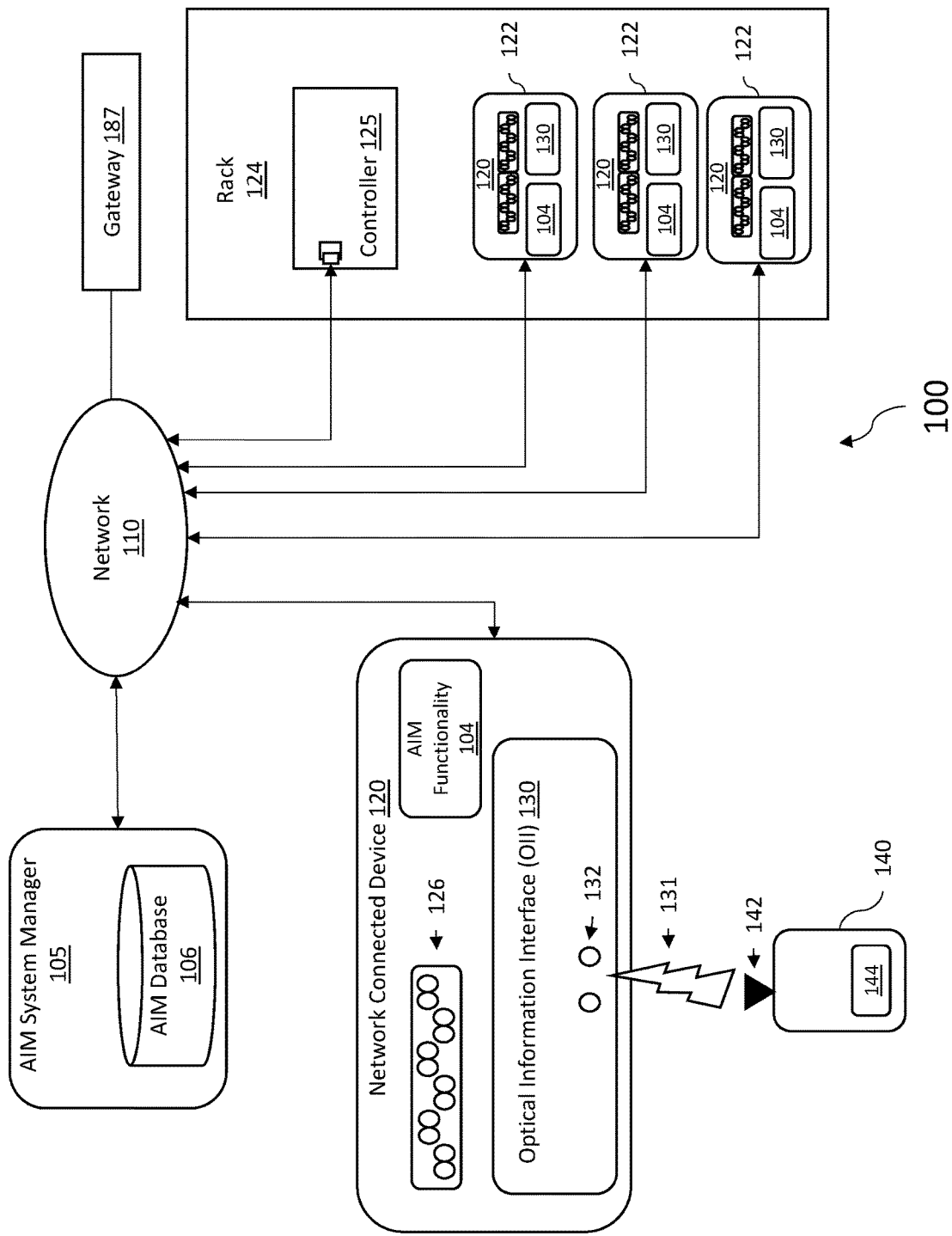
FIG. 1 is a diagram of an automated infrastructure management system of one embodiment of the present disclosure.

FIG. 1 is a block diagram of one exemplary embodiment of an automated infrastructure management (AIM) system 100 for a data center that is configured to track connections made using network connected devices 120. It should be understood that a "network connected device" as the term is discussed herein may comprise, and is intended to encompass, any type of device used by a network such as, but not limited to passive equipment (such as patching equipment (for example, patch panels), wall outlets, cables, cable bundles, consolidation points, and other breakout, consolidation, and/or splicing equipment) as well as active equipment (such as servers, switches, routers, and the like). The characterization of equipment as "passive" or "active" refers to the nature of the service plane functions performed by the equipment and not the management plane functions. For example, the patching connections made at the service ports of an "intelligent" or "managed" passive patch panel are passive even though that patch panel includes "active" management plane functionality such as controllers and network interfaces associated with the management ports of the patch panel. Each network connected device 120 includes at least one "connection point" or "port" 126 to connect that device 120 to the network and that is used for providing the primary service for which that device is deployed. Each such connection point or port 126 is also referred to here has a "service connection point" or "service port" 126. Each service connection point or service port 126 is configured so that at least one cable can be connected to the device 120 (using a connectorized or non-connectorized cable). The connections made at the service ports 126 of network connected devices 120 can be made with various types of cabling, including, without limitation, copper cables and fiber optic cables. The system 100 shown in FIG. 1 can be implemented at any type of facility, for example, in a data center or enterprise application. Other embodiments can be implemented in other ways (for example, where the system 100 is implemented in a central office or other facility of a telecommunication service provider and/or in another part of the telecommunication service provider's network). The network connected devices 120 may be housed within a chassis 122 and is optionally deployed in racks 124 along with a rack controller 125 and other items of equipment (not shown) (such as servers, routers, and switches). In other embodiments, the network connected devices 120 may be freestanding or otherwise not installed as part of a rack 124.

The AIM system 100 is configured to track connections made at the network connected devices 120 as well as connections with other equipment. In one aspect illustrated in FIG. 1, the AIM system 100 is configured to work with network connected devices 120, (such as patch panels) that have AIM functionality 104 for tracking connections made at the service ports 126 of network connected devices 120. Such network connected devices 120 may also be referred to here as "intelligent" or "managed" devices or equipment in the sense that such devices have local management-plane functionality for use within the management domain of the AIM system 100. As used herein, "unintelligent" or "unmanaged" devices or equipment refers to devices or equipment that do not include local management-plane functionality for use within the management domain of the AIM system 100 (even though information about such unmanaged devices or equipment and connections made therewith may be captured and tracked by the AIM system 100 via remote management-plane functionality). Also, an "unmanaged" device that does not include local management-plane functionality for use within the management domain of the AIM system 100 can include management-plane functionality that is used within other management domains (that is, management domains other than the AIM management domain). In other words, as used herein, whether a device is "managed" or "unmanaged" is determined with respect to the AIM management domain and AIM system 100. Unmanaged devices can include devices that are otherwise active or passive.

In one aspect illustrated in FIG. 1, for each service port 126 of a managed network connected device 120, the AIM functionality 104 may comprises a sensor, reader, interface, or other circuitry (collectively referred to here as a "sensor") for use in determining the presence of, and/or information from or about, a connector and/or cable attached to the associated service port 126. The AIM functionality 104 can be implemented in many different ways and the particular configuration illustrated in FIG. 1 is merely exemplary and should not be construed as limiting. In one aspect illustrated in FIG. 1, each network connected device 120 includes one or more service ports 126 into which cables may be coupled via connectors in order to implement a service-plane connection using that device 120. In various embodiments, the service ports 126 may be compatible with optical fiber connector formats such as Lucent Connector (LC) ports, Standard Connector (SC), multiple-fiber push-on/pull-off (MPO/MTP) connectors, or other connectors suitable for connecting to optical fibers known to one having skill in the art. In still other embodiments, the service ports 126 may couple with cables comprising electrical conductors such as, but not limited to, coaxial cables, Category (CAT) 5, CAT 6A, CAT 7, CAT 8, or other cables that are able to function as a physical medium for the transmission of data. In some embodiments, cables coupled to the service ports 126 may comprise hybrid cables that include both optical fibers and electrical conductors.

System 100 is a managed system in the sense that the connection of each of the service ports 126 of managed network connected devices 120 to respective cables is monitored and reported back to a server or other network system such as an AIM system manager 105 via network 110. In one aspect, the AIM system manager 105 is configured to compile asset and connection information and to provide an end-to-end trace of connections. The AIM system manager 105 stores the asset and connection information in an AIM database 106. The AIM system manager 105 and AIM database 106 can be implemented using one or more computers on which appropriate software is executed. In some embodiments, the AIM system manager 105 comprises a database 106 that stores port state information for each of the service ports 126 and/or tracks the occurrence of port state changes. In some embodiments, network 110 may be connected to other networks, such as the public Internet for example, by a gateway 187.

As shown in FIG. 1, network connected device 120 further comprises an optical information interface (OII) 130 from which a modulated short-range optical signal 131 is used to transmit information about the network connected device 120 to at least one mobile device 140. Mobile device 140 may comprise, for example, a cellular phone, tablet device, wearable device, or other mobile computing device having a camera 142 with which the modulated short-range optical signal 131 can be received and configured to execute an application 144 for extracting information from the received optical signal 131. In some embodiments, payload information carried by the optical signal 131 may be encrypted. In such embodiments, the application 144 would include the necessary key for decrypting and extracting the information from the optical signal 131 payload. The short-range optical signal 131 is generated by one or more optical emitters 132, such as light emitting diodes (LEDs) for example, and modulated by the OII 130 to carry predetermined information relevant to the network connected device 120. In one embodiment, OII 130 and application 144 are each configured to implement a one-way optical communications data link based on a standard such as the Institute of Electrical and Electronics Engineers (IEEE) 802.15.7 "Short-Range Optical Wireless Communications" standard for example. The optical power of the optical signal 131 is modulated by the OII 130, sending data transmissions in the form of one or more data packets. In some embodiments, alternative modulation techniques may be used such as, but not limited to, On-Off Keying (OOK) PHY, Variable pulse-position modulation (VPPM), Twinkle VPPM, Phase-shift keying (PSK), spatial-2-phase-shift keying (S2-PSK), Hybrid Spatial Shift Keying (HS-PSK), Offset VPPM, or other modulation technique. These modulation techniques cause rapid on and off flickering of the emitter 132, modulating the light and creating the binary data stream which carries the relevant information. The flicker of the optical signal 131 is faster than the human eye can detect so that to a bystander, the emitter 132 looks continuously on. The camera 142 operates at a certain preset frame per second shutter rate to achieve the desired sampling rate and captures the data stream from the optical signal 131. The data stream thus comprises a one-way broadcast transmission.

Figure 2:
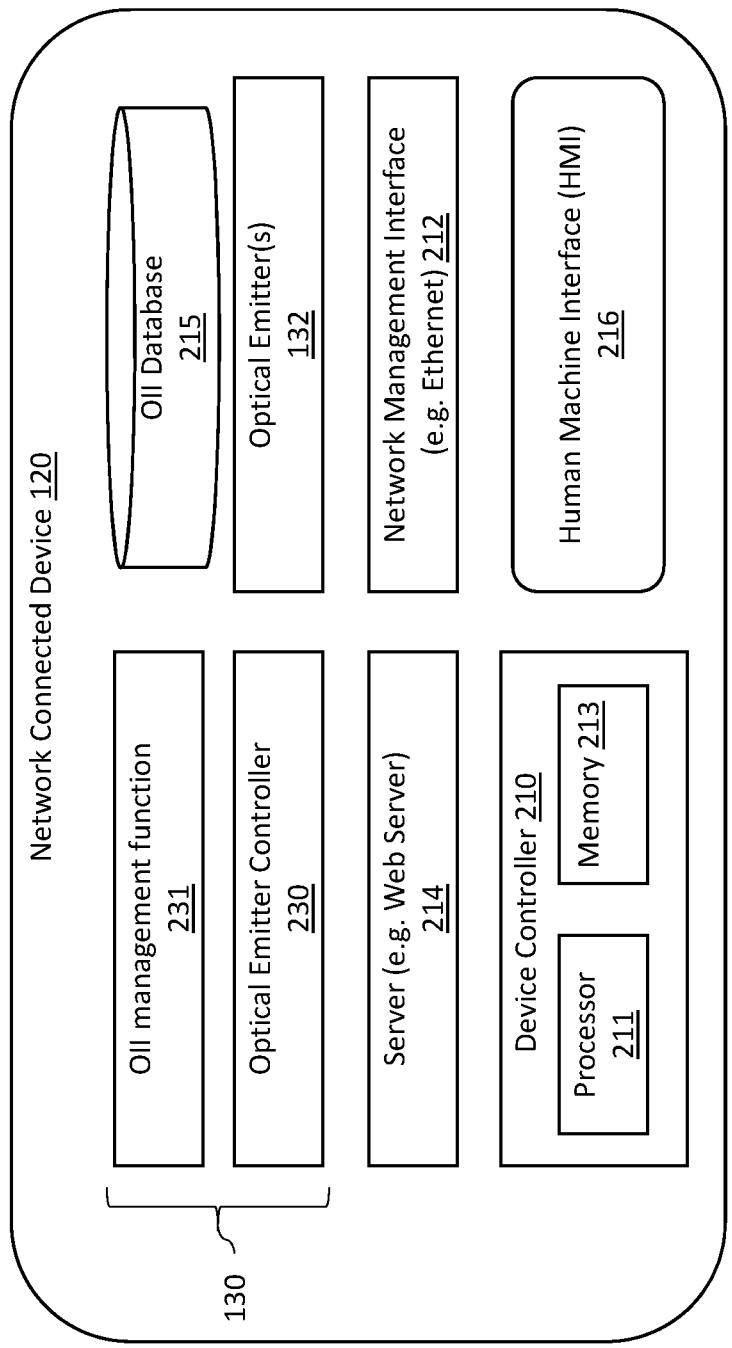
FIGS. 2 and 2A are diagrams of managed network connected devices each comprising an example optical information interface embodiment of the present disclosure.

FIG. 2 is a block diagram illustrating one embodiment of a network connected device 120 comprising an OII 130. Network connected device 120 includes a device controller 210, which may comprise a processor 211 coupled to a memory 213 and configured to execute code to implement device management and operational (that is, management-plane) functions specific to the particular network connected device 120. In one embodiment, the device controller 210 is coupled to at least one network management interface 212 through which the controller may communicate with the AIM system manager 105 via network 110 or through which other clients may access device 120 via network 110. In some embodiments, network management interface 212 comprises either a wired Ethernet interface or a wireless interface. Network connected device 120 further comprises at least one server 214 (such as a hypertext transfer protocol (HTTP) based web server, for example) implemented by the device controller 210 and which is accessible via the network management interface 212.

In the example embodiment shown in FIG. 2, the OII 130 comprises an optical emitter controller 230, and OII management function 231. In one embodiment, the OII management function 231 comprises an application stored in memory 213 and executed by the processor 211. OII management function 231 is configured to control the optical emitter controller 230 to modulate the output of the one or more optical emitters 132 and generate the optical signal 131. In one embodiment, the optical emitters 132 are specifically dedicated to the function of OII 130. In other embodiments, the optical emitters 132 may comprise normally on status indicators such as a power LED, status LED, or other LED. The output from the optical emitters 132 is modulated by the optical emitter controller 230 (for example, by controlling power to the optical emitters 132) to transmit information relevant to the network connected device 120 to mobile device 140 as discussed above. In some embodiments, the optical emitter controller 230 comprises an IEEE 802.15.7 LED interface.

In some embodiments, as opposed to controlling the optical emitters 132 directly, the optical emitter controller 230 may instead control an optical modulator (such as a thin film window or other device) whose opacity may be selectively controlled by applying an electrical control signal. For example, the optical emitters 132 may remain on and emit a non-modulated signal, and the optical output is modulated by passing the optical output through the optical modulator. The information would then be modulated to produce the optical signal 131 by controlling the opacity of the optical modulator. The contents carried by the one-way broadcast of optical signal 131 is flexible, and in some embodiments, dynamically reconfigurable. For example, in some implementations, the system 100 operator can dynamically reconfigure what information is broadcast from the OII 130 for one or more of the network connected devices 120, as described in greater detail below.

In one embodiment, the optical signal 131 broadcast by the OII 130 carries a payload that includes a network address via which the mobile device 140 may access the network management interface 212 to obtain information about the network connected device 120. The network address may be provided in the form of a Universal Resource Locator (URL), an Internet Protocol (IP) IPv4 or IPv6 address, or other format. In some embodiments in which the network address is provided as a URL, the application 144 may perform a Domain Name Service (DNS) lookup to obtain an IP address for the network management interface 212. In other embodiments, the network address may comprise the IP address for the network management interface 212, alleviating the need for the DNS lookup. With the IP address, the application 144 may access the network management interface 212 to communicate with the network connected device 120. For example, the application 144 may access the network management interface 212 to initiate an HTTP request to access the controller's web server 214. In other embodiments, the optical signal 131 broadcast by the OII 130 may instead, or additionally, transmit other information such as, but not limited to, a device ID, device configuration information (including number of slots, ports, port types, port occupancy, and the like) device status and/or fault information, a media access control (MAC) address, and/or URLs for supplemental online resources such as user guides and installation guides, for example. In some embodiments, the optical signal 131 may include a URL or IP address for accessing the AIM system manager 105 associated with the network connected device 120.

In some embodiments, the OII 130 for a managed network connected device 120 can be remotely reconfigured via the AIM system manager 105, or directly by accessing the OII management function 231 and/or the device server 214 via the network management interface 212. In some embodiments, the network connected device 120 may also comprise a human-machine interface (HMI) 216 where the OII 130 is reconfigurable through that HMI 216. In one embodiment, the OII 130 includes an OII database 215 that stores the information selected for broadcast over optical signal 131. In some embodiments, the OII database may be maintained in memory 212. In one embodiment, the OII management function 231 accesses the OII database 215 to determine what information is to be encoded onto the optical signal 131, and then sends that information to the optical emitter controller 230. Optical emitter controller 230 then controls the optical output from emitter(s) 132 to modulate the information onto the optical signal 131.

In some embodiments, the OII database 215 may include fields containing preformatted strings of data, comprising information such as, but not limited to, device manufacturer, model numbers, vendor URL addresses, firmware and software versions, and the like, or information such as the physical location (building, floor, rack, and the like), or configuration and interconnection information (such as the number and types of ports supported by the device, and what those ports are connected to). Fields of preformatted strings of data may be prepopulated at the factory by the device manufacturer, or subsequently programmed by the system 100 administrator. Other fields of database 215 may be controlled and populated directly by the device controller 210. For example, fields controlled by device controller 210 may include device status information, alarm conditions and/or logs of alarms, port occupancy and/or status information. In one embodiment, OII management function 231, or other application executed by device controller 210, may be accessed by the system administrator to determine which of the items stored in the OII database 215 are transmitted over the optical signal 131. For example, the OII database 215 may include a flag for each stored item of information, indicating if that item of information should be passed to the optical emitter controller 230. The system 100 administrator may then access a screen to set or reset said the flags in order to configure what information is to be transmitted by the OII 130 over the optical signal 131.

In some embodiments, the OII management function or other application executed by device controller 210 may apply logic conditions to dynamically reconfigure what information is passed to the optical emitter controller 230. For example, in one embodiment, the OII 130 may be configured so that the optical signal 131, by default under normal conditions, only broadcasts a network address over the optical signal 131. That network address could, for example, allow a technician to access the server 214 directly through the network management interface 212. However, when a fault condition or other alarm is present, the OII 130 may reconfigure itself so that additional information, or alternate sets of information, are instead passed to the optical emitter controller 230. For example, if a high temperature condition is detected in device 120, the OII management function 231 may dynamically reconfigure OII 231 (such as by toggling one or more of the OII database 215 flags) so that a temperature alarm (and/or a temperature value) is transmitted over optical signal 131 in addition to the network address. As another example, the device 120 may experience a fault where the network management interface 212 and/or the server 214 become inoperable. Under these circumstances, broadcasting the network address would be of no value. As such, the OII management function 231 may dynamically reconfigure OII 231 under such conditions to instead broadcast an alternate network address, such as an address for the AIM system manager 105, or an alternate address that would include information for troubleshooting the fault, or access to a page or screen that would permit the local technician to submit a trouble ticket describing the received faults. In one embodiment, the application 144 on the mobile device 140 may pre-populate a trouble ticket with information based on the contents of the optical signal 131 received from the degraded OII 130 and submit the trouble ticket to a network address identified in the optical signal 131.

Figure 2A:
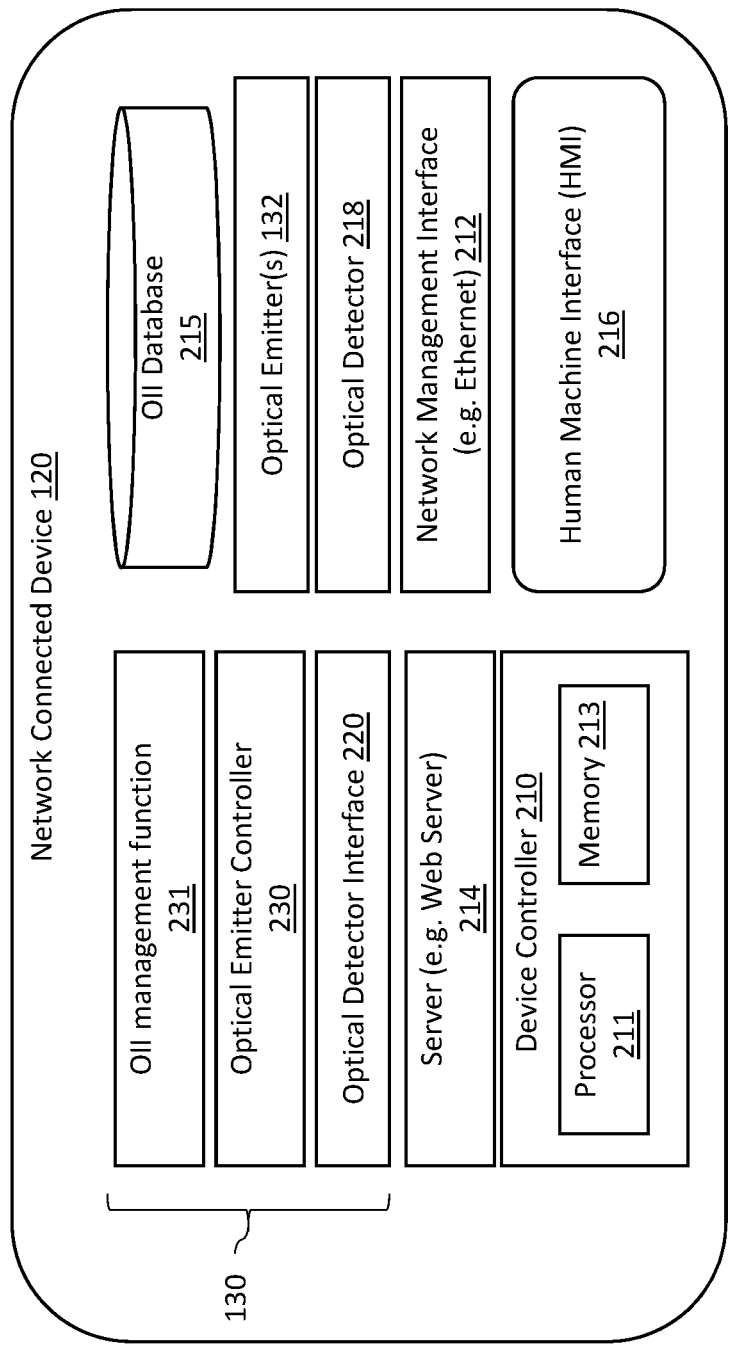

FIG. 2A is a block diagram illustrating an alternate implementation of the network connected device 120 shown in FIG. 2, where the OII 130 further comprises an optical detector 218 (such as a camera or photoreactor, for example) and an optical detector interface 220 in order to facilitate bi-directional communication between the OII 130 and the mobile device 140. The optical information interface management function 231 may be configured to receive data from the optical detector interface 220 extracted from an optical signal received from the mobile device 140 by the optical detector 218. In one embodiment, the camera interface 220 comprises an IEEE 802.15.7 camera interface. The managed connectivity device 120 therefore has both the ability to optically transmit data, and optically receive data. The mobile device 140, further discussed below, may also comprise a camera to receive data, and an emitter such as an LED to transmit data.

This configuration allows a mobile device 140 to connect to a network connected device 120 and create a point to point bidirectional connection, rather than just receive a broadcast connection, as discussed above. Bidirectional communication may be useful in situations where a limited data exchange would be beneficial. For example, if there is a hardware upgrade, the mobile device 140 requests the network connected device 120 to shut down, or the mobile device 140 may request status information, device reset, errors, or port occupancy, set values, or the like.

In one embodiment in operation, the OII 130 would initially operate in broadcast mode, in the same manner as discussed above. As part of the broadcast of optical signal 131, the OII 130 transmit a 64 bit 802.15 IEEE full address, or a network Id and an IEEE 802.15 2-byte short address. It should be understood that these addresses may not always be in the network device header to avoid being part of a network, but rather in the payload carried over the optical signal 131. The mobile device 140 initially listens to the optical signal 131 provided by the OII 130 in broadcast mode. Once the mobile device 140 receives the network device address for the OII 130 and determines that bidirectional communication is needed, it may initiate a connection request to connect by sending a connection request message to the OII 130. If the request is accepted, the OII will reply with a connection confirm message, and then bidirectional data exchange can occur. Either the mobile device 140, or the network connected device 120 may terminate the connection by initiating a disconnect action (for example, by exchanging disconnect request and disconnect confirm messages).

In some embodiments, while a point to point connection in in operation, the network device 120 ceases operating in broadcast mode, and the OII 130 will only communicate with the mobile device 140 with which it has established the point to point connection. The mobile device 140's destination address may be obtained by the OII 130, upon receiving the connect request message from the mobile device 140.

Figure 3:
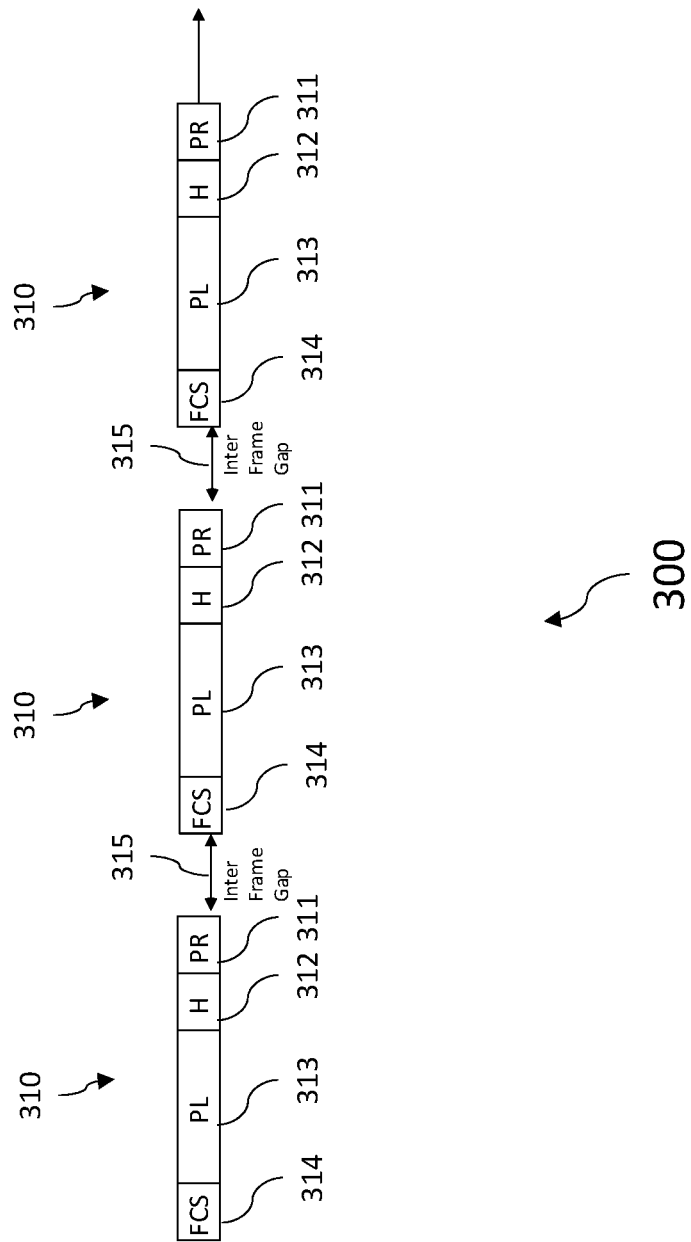
FIG. 3 is a diagram illustrating frames of an optical signal transmitted from an optical information interface of one embodiment of the present disclosure.

In some embodiments, the data transmitted via optical signal 131 is broadcast as a continuous stream and may be implemented by sending physical layer frames. The frames may conform to a standard, such as IEEE 802.15.7 for example, and the relevant data selected from the OII database 215 is contained in the payload of the packets. For example, FIG. 3 illustrates at 300 a series of physical layer frames 310 which may be modulated onto light generated by optical emitters 132. In the example shown in FIG. 3, each frame 310 comprises a preamble 311, header 312, payload 313 and frame check sequence 314. Each of the frame 310 may be separated by an inter-frame gap 315. In some embodiments, each frame 310 may carry a distinct payload comprising a different set of relevant data. For example, a first 310 may include the network address, a second frame 310 error conditions, and a third frame 310 device status information.

As noted above, in some embodiments, the optical emitter controller 230 may be coupled to more than one optical emitter 132. In such embodiments, a plurality of optical emitters may be employed to provide an optical signal 131 comprising a plurality of distinct optical streams, thus providing a greater rate of data transmission as compared to an optical signal 131 generated by only a single optical emitter 132. In such embodiments, the application 144 executed by mobile device 140 would implement a pattern recognition algorithm that discerns the modulated light from each of the several emitters 132 appearing in the images captured by camera 142.

The example embodiments described above have mostly focused on managed network connected devices 120 or similar devices that comprise processors that may be adapted with software to control the OII 130 to perform the various functions discussed above. Other embodiments, however, may be drawn to unmanaged network connected devices 120 that do not otherwise implement any management-plane functions (for example, device 120 that do not provide processing resources for management-plane functions or otherwise do not implement a server 214 and/or include a network management interface 212 for such management-plane functions).

Figure 4:
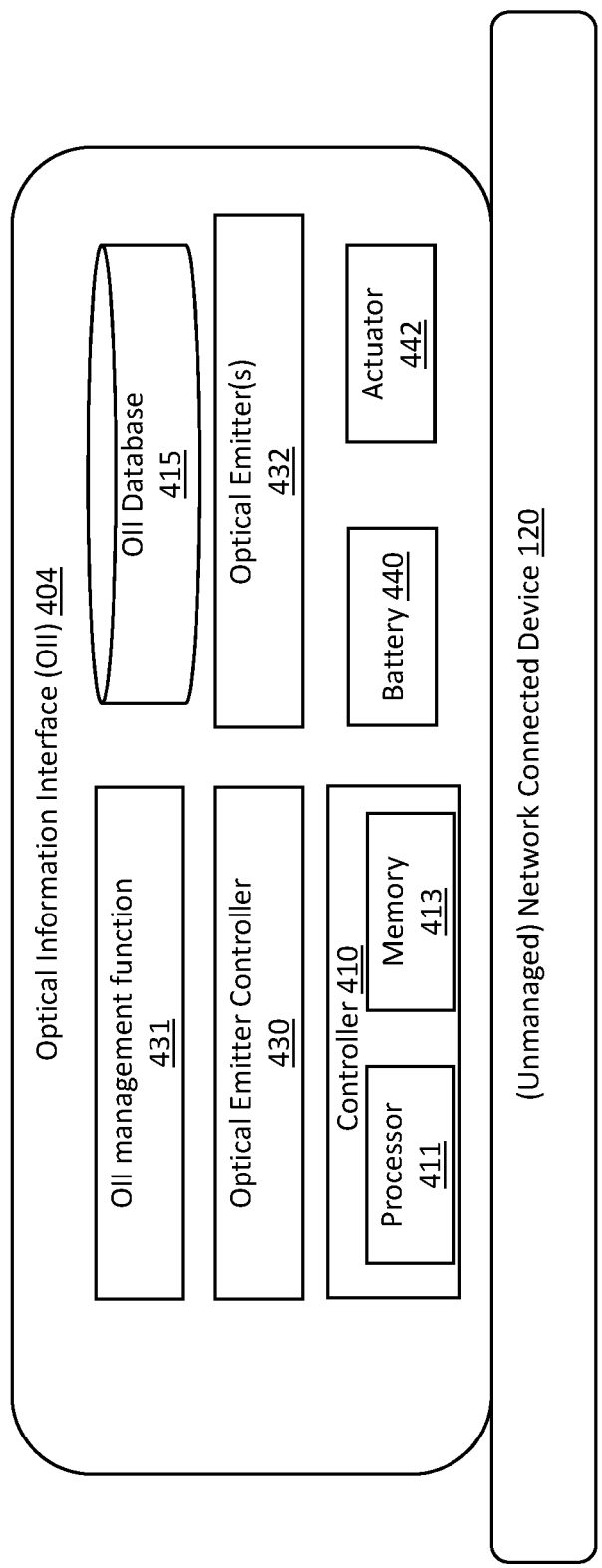
FIG. 4 is a diagram of an unmanaged network connected device comprising an optical information interface of one embodiment of the present disclosure.

FIG. 4 is a block diagram illustrating one embodiment of an unmanaged network connected device 120. In this embodiment, an implementation of OII 130 (shown in FIG. 4 as OII 404), may be fabricated as an integrated component of the unmanaged network connected device 120 or installed as a retrofitted device module mounted or otherwise affixed to the unmanaged network connected device 120. In the embodiment of FIG. 4, OII 404 comprises a controller 410 that includes a processor 411 coupled to a memory 413. The processor 411 is configured to implement the OII management function 431 (for example, by executing code stored in the memory 413) to realize the functions of the OII 404 described herein. OII 404 further comprises an optical emitter controller 430 (which may comprise an IEEE 802.15.7 LED interface) configured modulate the optical output from the one or more optical emitters 432 in order to and generate the optical signal 131. Output from the one or more optical emitters 432 can be modulated by the optical emitter controller 430 in order to transmit predefined information associated with the network connected device 120 to mobile device 140. In some embodiments, as opposed to controlling the optical emitters 432 directly, the optical emitter controller 430 may instead control an optical modulator (such as a thin film window or other device) whose opacity may be selectively controlled by applying an electrical control signal. For example, the optical emitters 432 may emit a non-modulated signal, and the optical output is modulated by passing the optical output through the optical modulator and controlling the opacity of the optical modulator.

The OII 430 includes an OII database 415 that stores the predefined information as a set of information selected for broadcast over optical signal 131. In some embodiments, the OII database 415 may be maintained in memory 413. The OII database 415 may include fields containing preformatted strings of data in the same manner as OII database 215. For example, the OII database 415 may include information such as, but not limited to, device manufacturer, model numbers, vendor URL addresses, firmware and software versions, and the like, or information such as the physical location (building, floor, rack, and the like), or configuration and interconnection information (such as the number and types of ports supported by the device, and what those ports are connected to). Fields of preformatted strings of data may be prepopulated at the factory by the device manufacturer, or subsequently programmed by the system 100 administrator.

With the embodiment shown in FIG. 4, instead of broadcasting a signal 131 that includes a network address for the device 120, the optical signal may instead provide a network address for a remote server that, for example, provides accesses to vendor catalog information, user guide/instruction manuals, a data sheet or the like. Alternatively, the network address may provide an address with that gives access to the AIM system manager 105 for that device 120. The AIM system manager 105 may then provide information regarding the device 120 such as, but not limited to, location information, or connectivity information as indicated in the AIM database 106, for example. In some embodiments, the OII database 415 may be configured at the factory with general device information or provided a device specific database configured at time of deployment.

To provide power to the OII 404, in some embodiments the OII 404 may comprise a battery 440 to energize the various components of OII 404. Because the energy stored in batteries will deplete over time, energy management is a notable consideration in order to maximize the operating life of the battery 440. If operation of the processor 411, emitter controller 430 and emitters 432 were consistently maintained in an active full powered state, the charge of battery 440 would soon be depleted, greatly reducing the effective life of the OII 404. In order to manage operation of the OII 404 so that it only produces the optical signal 131 when there is a need, OII 404 further comprises an actuator 442. When there is no demand for information from the OII 404, it maintains itself in a low power ("sleep") mode where at least one of the processor 411, emitter 432 and emitter controller 430 function in a reduced power state. Activation using actuator 442 will wake the OII 404 and prompt it to begin transmission of the optical signal 131 for a predetermined period of time.

In some embodiments, the actuator 442 may comprise a physical button which may be manually depressed by a technician to wake the OII 404 for a sufficient period of time for the technician to use the mobile device 140 to read the optical signal 131. In other embodiments, the actuator 442 may comprise an optical sensor such as a photosensitive sensor or photovoltaic cell. In such an embodiment, the application 144 may actuate a flash (such as an LED) on the mobile device 140. That optical actuation signal from the flash is sensed by the actuator 442, which in turn sends a signal to the processor 411 to wake the OII 404 for a sufficient period of time for the technician to use the mobile device 140 to read the optical signal 131.

In some embodiments, application 144 may modulate the flash produced by the mobile device 140 with a predetermine pattern that is recognized by OII 404. The OII 404 will wake for the recognized flash pattern, but not respond to other light patterns. Thus, the OII 404 will not inadvertently respond and wake due to mere changes in ambient light conditions, or random light signals. In some embodiments, the optical sensor actuator 440 may generate sufficient voltage in response to receiving the flash from the mobile device 140 to generate a voltage that is applied to an I/O input or interrupt, which will wake processor 411 to active power mode.

It should be noted that the OII described herein, whether for managed or unmanaged network connected device implementations, may take various physical forms and be realized various ways. For example, in one embodiment, an OII may be directly fabricated within plastic material that comprise a component (such as the enclosure) for the network controlled device 120. For example, for outside plant equipment such as splice enclosures, the OII can build into directly into the housing with touchpads for activation.

FIG. 5 illustrates another embodiment of an OII 510. In this example embodiment, an OII 510 is utilized in conjunction with a physical adapter module for use with a patch cable 502. In this embodiment, the OII 510 is functionally equivalent to, and may comprise the same elements as, the OII 404 shown in FIG. 4. However, the OII 510 further comprises a physical form factor that includes a port 504 in which a connector 506 of the cable 502 may be inserted. Moreover, the OII 510 may include a plug component 512 configured to plug into a port 508 of a network connected device (such as a service port 126). In one embodiment, a pass-through element 520 passes all signals between the port 508 and the connector 506 such that the existence of the OII 510 is completely transparent to either the port 508 or the connector 506. In this embodiment, the OII database 415 may be programed to store information about the patch cable 502 so that a technician may obtain information about the patch cable 502 from the optical signal 131 emitted by OII 510. In some embodiments, OII 510 may further include a power module 530 such as a Power-over-Ethernet (POE) power module. In such embodiments, where power to operate OII 510 is available from either the port 508 or patch cable 502, the power module 530 may selectively tap that power for operating the components of OII 510. In some embodiments, OII 510 may self-configure to use power from power module 530 when POE is available or use battery 440 power when POE is not available. In some embodiments, the set of information transmitted by the optical signal 131 may indicate whether OII 510 is operating on POE or battery power.

FIG. 6 is a block diagram illustrating one embodiment of the mobile device 140 that may be used in conjunction with any of the embodiments described herein to read information from an optical signal 131 generated by an OII 130. In this embodiment, the mobile device 140 includes a processor 610 coupled to a memory 620 (which stores the application 144 and any data associated with that application), an HMI 616 (such as a touch screen interface, for example) and a wireless network interface 612. Application 144 includes executable code for accessing the information received from optical signal 131. For embodiments where the payload carried by the optical signal 131 is encrypted, the application 144 includes an algorithm and/or key for decrypting that payload.

Mobile device 140 further includes a camera 142 coupled to processor 610 and in communication with application 144. In one embodiment, application 144 operates camera 142 to obtain images of the optical signal 131 at a frame rate that corresponds to the data rate with which information is modulated onto the optical signal 131. For embodiments where the optical signal 131 comprises multiple optical signal components generated by separate optical emitters 132, the application 144 is programed to recognize in the captured images the individual optical signal components and process the modulated data on each separately. In this way, the data rate of information received from an OII 130 may be increased over embodiments where only a single optical emitter 132 is employed.

In some embodiment, the mobile device 140 may include a camera interface 614 (such as an IEEE 802.15.7 camera interface) configured to receive images from the camera 142 and convert the images into an output comprising a data stream that carries the extracted payload data received from the optical signal 131. In such embodiments, the data stream output may be received and processed by the application 144 in order to display onto HMI 616 information derived from the payload of the optical signal 131. For example, where a network address is received, the application 144 executes a browser function (such as a web browser) to send HTTP requests via wireless network interface 612 (to network 110 or another network such as the public Internet) and display pages received in an HTTP response. The browser function may be integral to application 144, or alternately implemented by a separate application. Where the optical signal 131 carries other data, such as status or alarm information, the application 144 may directly present that information on the HMI 616. As mentioned above, the application 144 may be programed to specifically respond to reception of critical condition information, such as alarm conditions, by immediately relaying that information via wireless network interface 612 to a system operator (for example, to the AIM system manager 105).

In order to support bidirectional communication, such as described above with respect to FIG. 2A, in some embodiments, the mobile device 140 may further include an LED interface 618 (which may comprise an IEEE 802.15.7 LED interface) coupled to an LED 617 (which, for example, may comprise the flash for use with camera 142). Application 144 may then control the LED Interface 618 to modulate light emitted by LED 617 in order to transmit messages, commands, or other data and thereby establish a bidirectional point to point data exchange with the OII 130.

EXAMPLE EMBODIMENTS

Example 1 includes a device, the device comprising: at least one service port to connect a cable to the device; an optical information interface comprising: an optical information interface management function executed by a processor coupled to a memory; an optical information interface database that stores information associated with the device; and an optical emitter controller in communication with the optical information interface management function; wherein the optical information interface management function receives from the optical information interface database a set of information selected for optical broadcast; and wherein the optical emitter controller varies an optical output of at least one optical emitter to modulate the set of information selected for optical broadcast onto an optical signal generated by the at least one optical emitter.

Example 2 includes the device of example 1, wherein the optical information interface further comprises the optical emitter, wherein the optical emitter controller varies a power to the at least one optical emitter to modulate the set of information onto the optical signal.

Example 3 includes the device of any of examples 1-2, wherein the at least one optical emitter generates a non-modulated output, and the optical emitter controller comprises an optical modulator, wherein the optical emitter controller varies an opacity of the optical modulator to modulate the set of information onto the optical signal.

Example 4 includes the device of any of examples 1-3, further comprising: a network management interface; and server accessible from via the network from the network management interface; and wherein the set of information selected for optical broadcast comprises a network address associated with the network management interface.

Example 5 includes the device of example 4, wherein the network address comprises either a universal resource locator (URL) or an Internet Protocol (IP) address associated with the network management interface.

Example 6 includes the device of any of examples 1-5, wherein the information associated with device stored in the optical information interface database comprises at least one of: a network address associated with the device; a network address for a remote server that provides information associated with the device; information regarding an operational status of the device; information regarding a location of the device; information regarding an alarm condition for the device; information regarding a port status of the at least one network interface; information identifying connectivity information for the at least one network interface; a network address for an Automated Infrastructure Management (AIM) system manager associated with the device, wherein the AIM system manager includes an AIM database that stores port state and connectivity information for the device.

Example 7 includes the device of any of examples 1-6, wherein in the set of information selected from the optical information interface database for optical broadcast onto the optical signal is remotely configurable.

Example 8 includes the device of any of examples 1-7, wherein in the optical information interface management function is configured to dynamically reconfigure the set of information selected from the optical information interface database in response to either changes in an operational status of the device or an alarm output generated by the processor.

Example 9 includes the device of any of examples 1-8, wherein the at least one optical emitter comprises a plurality of optical emitters and the optical signal comprises a plurality of optical signal components each generated by a respective optical emitter.

Example 10 includes the device of any of examples 1-9, wherein the at least one optical emitter comprises a light emitting diode (LED).

Example 11 includes the device of any of examples 1-10, wherein the set of information selected for optical broadcast is transported within the payload of one or more frames modulated onto the optical signal.

Example 12 includes the device of example 11, wherein the payload comprising the set of information selected for optical broadcast is encrypted.

Example 13 includes the device of any of examples 1-12, wherein the device comprises a managed device and the processor comprises a component of a device controller for the device.

Example 14 includes the device of any of examples 1-13, wherein the device comprises an unmanaged device, wherein the optical information interface further comprises: a battery; and an actuator; wherein the optical information interface is powered from the battery; and wherein the optical information interface enters a full power mode to transmit the optical signal for a predetermined duration of time in response to an actuation of the actuator.

Example 15 includes the device of example 14, wherein the optical information interface enters a reduced power sleep mode after expiration of the predetermined duration of time.

Example 16 includes the device of any of examples 14-15, wherein the actuator comprises a photosensitive device that produces a signal to cause the optical information interface to enter the full power mode in response to receiving an optical actuation signal.

Example 17 includes the device of example 16, wherein the optical information interface is configured to enter the full power mode in response to the optical actuation signal having a predetermined pattern.

Example 18 includes the device of any of examples 14-17, wherein the optical information interface further comprises a Power-over-Ethernet (POE) power module configured to power the optical information interface using power received vie the at least one network interface.

Example 19 includes the device of any of examples 1-18, wherein the optical information interface comprises a physical adapter module for use with a patch cable, the optical information interface having a physical form factor that includes a port configured to receive a connector of the patch cable; and a plug component configured to plug into a port of another device; wherein the optical information interface database and the set of information selected for optical broadcast include information associated with the patch cable.

Example 20 includes the device of example 19, wherein the optical information interface further comprises a pass-through element configured to pass data signals between the port and the connector.

Example 21 includes the device of any of examples 1-20, wherein the optical information interface further comprises: an optical detector; and an optical detector interface in communication with the optical detector; wherein the optical information interface management function is configured to receive data from the optical detector interface extracted from an optical signal received by the optical detector and establish point to point bidirectional communication with a mobile device.

Example 22 includes a mobile device for communicating with the optical information interface of the device of any of examples 1-21, the mobile device comprising: a processor coupled to a memory; a camera coupled to a camera interface; a human machine interface coupled to the processor; an application executed by the processor; a wireless network interface; wherein the camera is configured to receive the optical signal and the camera interface is configured to extract the set of information selected for optical broadcast from the optical signal; wherein the application is configured to output data to the human machine interface based on the set of information selected for optical broadcast.

Example 23 includes the mobile device of example 22, wherein the application is configured to obtain information associated with the device via the wireless network interface based on a network address included in the set of information selected for optical broadcast.

Example 24 includes the mobile device of any of examples 22-23, wherein the application is configured to obtain information associated with the device from the at least one network interface of the device, via the wireless network interface, based on a network address included in the set of information selected for optical broadcast.

Example 25 includes the mobile device of any of examples 22-24, wherein the application is configured to obtain information associated with the device from a system manager associated with the device, via the wireless network interface, based on a network address included in the set of information selected for optical broadcast.

Example 26 includes the mobile device of any of examples 22-25, wherein the application is configured to obtain information associated with the device from a remote data server, via the wireless network interface, based on a network address included in the set of information selected for optical broadcast.

Example 27 includes the mobile device of any of examples 22-26, wherein the application is configured to determine status or alarm information for the device based the set of information selected for optical broadcast.

Example 28 includes the mobile device of any of examples 22-27, wherein the application is configured to execute a pattern recognition algorithm that discerns modulated light appearing in images captured by the camera.

Example 29 includes the mobile device of any of examples 22-28, wherein the set of information transported by the optical signal is encrypted and the application includes an algorithm configured to decrypting the set of information.

Example 30 includes the mobile device of any of examples 22-29, further comprising: a flash emitting device; wherein the application is configured to control the flash to wake the optical information interface from a low power mode.

Example 31 includes the mobile device of example 30, wherein the application is configured to modulate the flash based on a predetermined pattern to wake the optical information interface from a low power mode.

Example 32 includes the mobile device of any of examples 22-31, further comprising: an LED; and an LED interface; wherein the application is configured to control the LED interface to modulate light emitted by the LED in order to transmit at least one of messages, commands, and other data, and further configured to establish a bidirectional point to point data exchange with device.

Example 33 includes an automated infrastructure management (AIM) system, the system comprising: a plurality of devices, each comprising a respective one of the device of any of claims 1-21; at least one mobile device comprising the mobile device of any of claims 22-32; at least one server that implements an AIM System Manager; wherein a first device of the plurality of devices is configured to transmit one or both of status information and configuration information to a first mobile device of the at least one mobile device via a network in response to a query from the first mobile device received via the network; wherein the query from the first mobile device is initiated by the first mobile device in response to the set of information as received from the optical signal.

In various alternative embodiments, system and/or device elements, method steps, or example implementations described throughout this disclosure (such as any of the port modules, port state monitors, patching equipment and other devices, the AIM system manager, rack controllers, network and wireless communication circuits, port sensing circuits, sensor controllers or other controllers, interfaces, profiles or services, or sub-parts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "controller", "processor", "port", "interface", "sensor", "monitor", "circuit", each refer to non-generic device elements that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:
1. A device, the device comprising:
   at least one network service port to connect a cable to the device;
   a network management interface;
   a server accessible from via a network from the network management interface; and
   an optical information interface comprising:
      an optical information interface management function executed by a processor coupled to a memory;
      an optical information interface database that stores information associated with the device; and an optical emitter controller in communication with the optical information interface management function;

wherein the optical information interface management function receives from the optical information interface database a set of information selected for optical broadcast;

wherein the optical emitter controller varies an optical output of at least one optical emitter to modulate the set of information selected for optical broadcast onto an optical signal generated by the at least one optical emitter; and wherein the set of information selected for optical broadcast comprises a network address associated with the network management interface.

2. The device of claim 1, wherein the at least one optical emitter generates a non-modulated output, and the optical emitter controller comprises an optical modulator, wherein the optical emitter controller varies an opacity of the optical modulator to modulate the set of information onto the optical signal.

3. The device of claim 1, wherein the information associated with device stored in the optical information interface database comprises at least one of:
a network address associated with the device;
a network address for a remote server that provides information associated with the device;
information regarding an operational status of the device;
information regarding a location of the device;
information regarding an alarm condition for the device;
information regarding a port status of the at least one network interface;
information identifying connectivity information for the at least one network interface;
a network address for an Automated Infrastructure Management (AIM) system manager associated with the device, wherein the AIM system manager includes an AIM database that stores port state and connectivity information for the device.

4. The device of claim 1, wherein in the optical information interface management function is configured to dynamically reconfigure the set of information selected from the optical information interface database in response to either changes in an operational status of the device or an alarm output generated by the processor.

5. The device of claim 1, wherein the set of information selected for optical broadcast is transported within the payload of one or more frames modulated onto the optical signal.

6. The device of claim 1, wherein the device comprises an unmanaged device, wherein the optical information interface further comprises:
a battery; and
an actuator;
wherein the optical information interface is powered from the battery; and
wherein the optical information interface enters a full power mode to transmit the optical signal for a predetermined duration of time in response to an actuation of the actuator.

7. The device of claim 6, wherein the optical information interface enters a reduced power sleep mode after expiration of the predetermined duration of time.

8. The device of claim 6, wherein the actuator comprises a photosensitive device that produces a signal to cause the optical information interface to enter the full power mode in response to receiving an optical actuation signal.

9. The device of claim 8, wherein the optical information interface is configured to enter the full power mode in response to the optical actuation signal having a predetermined pattern.

10. The device of claim 1, wherein the optical information interface comprises a physical adapter module for use with a patch cable, the optical information interface having a physical form factor that includes a port configured to receive a connector of the patch cable; and
a plug component configured to plug into a port of another device;
wherein the optical information interface database and the set of information selected for optical broadcast include information associated with the patch cable.

11. The device of claim 10, wherein the optical information interface further comprises a pass-through element configured to pass data signals between the port and the connector.

12. The device of claim 1, wherein the optical information interface further comprises:
an optical detector; and
an optical detector interface in communication with the optical detector;
wherein the optical information interface management function is configured to receive data from the optical detector interface extracted from an optical signal received by the optical detector and establish point to point bidirectional communication with a mobile device.

13. A method for optically communicating information associated with a device, the method comprising:
at an optical information interface, retrieving from an optical information interface database information associated with the device selected for optical broadcast, wherein the optical information interface comprises an optical information interface management function executed by a processor coupled to a memory, the optical information interface database, and an optical emitter controller in communication with the optical information interface management function, wherein the device comprises at least one network service port to connect a cable to the device, a network management interface, and a server accessible from via a network from the network management interface;
selecting a set of information for optical broadcast that includes a network address associated with the network management interface; and
varying an optical output of at least one optical emitter to modulate the set of information selected for optical broadcast onto an optical signal generated by the at least one optical emitter.

14. The method of claim 13, wherein the at least one optical emitter generates a non-modulated output, wherein varying the optical output of at least one optical emitter further comprises:
varying an opacity of an optical modulator to modulate the set of information onto the optical signal.

15. The method of claim 13, further comprising:
entering a full power mode to transmit the optical signal for a predetermined duration of time in response to an actuation of an actuator; and
entering a reduced power sleep mode after expiration of the predetermined duration of time.

16. The method of claim 15, wherein the actuator comprises a photosensitive device that produces a signal to cause the optical information interface to enter the full power mode in response to receiving an optical actuation signal.

17. The method of claim 13, wherein the optical information interface comprises a physical adapter module for use with a patch cable, the optical information interface having a physical form factor that includes a port configured to receive a connector of the patch cable; and
- a plug component configured to plug into a port of another device;
- wherein the optical information interface database and the set of information selected for optical broadcast include information associated with the patch cable.

18. The method of claim 17, wherein the optical information interface further comprises a pass-through element, the method further comprising:
- passing data signals between the port and the connector via the pass-through element.

\* \* \* \* \*